May 20, 1952  H. E. HIGBIE  2,597,638
EXTRUSION DIE FOR SOLVENTLESS POWDER
Filed May 15, 1951  2 SHEETS—SHEET 1

INVENTOR.
Howard E. Higbie
BY
G. J. Kessenich & A. W. Dew
ATTORNEYS

May 20, 1952   H. E. HIGBIE   2,597,638
EXTRUSION DIE FOR SOLVENTLESS POWDER
Filed May 15, 1951   2 SHEETS—SHEET 2
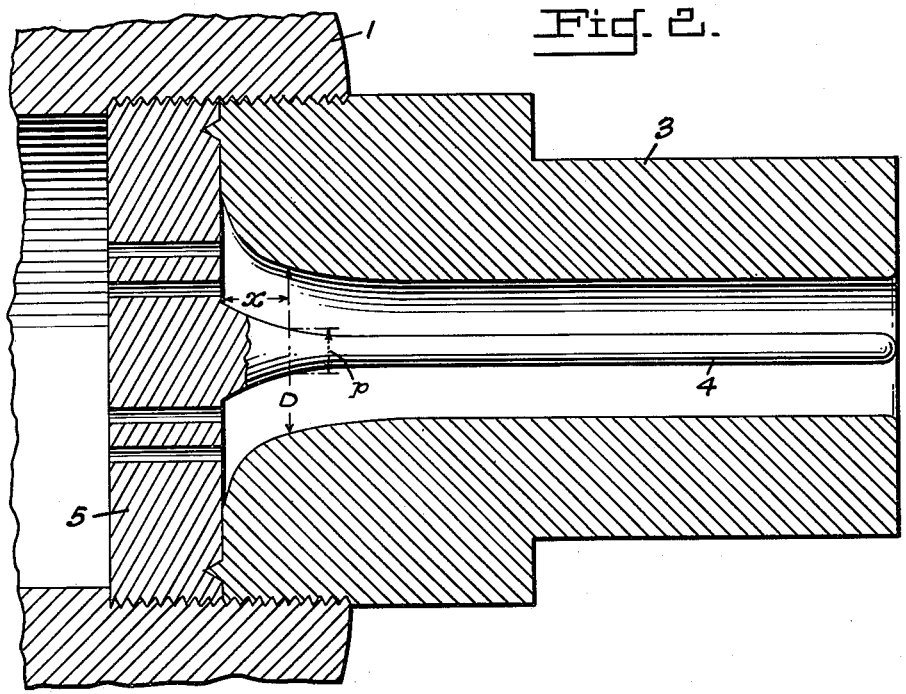
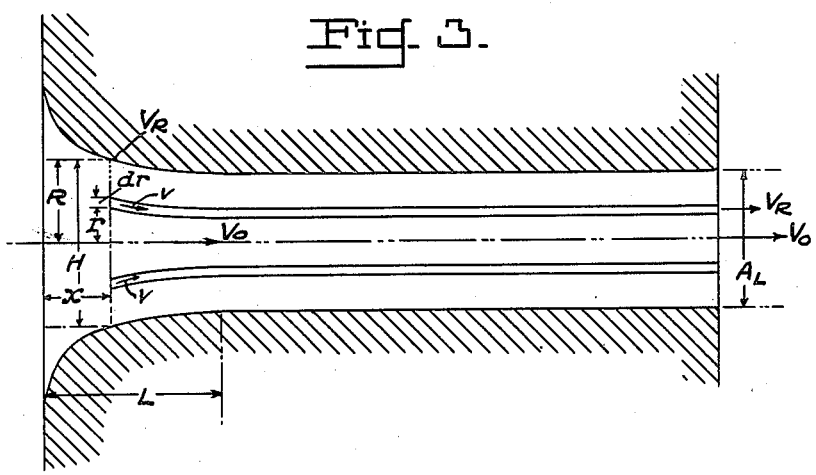
INVENTOR.
Howard E. Higbie
BY
G. J. Kessenich + A. W. Dew
ATTORNEYS Patented May 20, 1952

2,597,638

UNITED STATES PATENT OFFICE 2,597,638

EXTRUSION DIE FOR SOLVENTLESS POWDER

Howard E. Higbie, Pittsburgh, Pa., assignor to the United States of America as represented by the Secretary of the Army Application May 15, 1951, Serial No. 226,435

2 Claims. (Cl. 18—12)

This application is a continuation in part of application Serial Number 786,623, filed November 18, 1947, same title.

My invention relates to the construction of a die for the extrusion of solventless double base powder, and has for its primary object the provision of a die permitting the maximum rate of extrusion consistent with the production of powder free from structural defects.

Another object is to produce a die having the shortest possible axial length without causing excessively high acceleration at any one point in the die. Short die contours are desirable both from the standpoint of ease of fabrication and from the standpoint of elimination of spindle drifting and web variation, where a spindle is used to produce perforations in the extruded powder.

Double base powders are explosives having as their principal ingredients nitroglycerine and nitrocellulose. In physical appearance they do not resemble a powdered material in the ordinary sense, as they form a homogeneous plastic mass of dense elastic consistency. As widely used for the purpose of military rocket propulsion the "powder" is extruded in the form of short tubes of considerable diameter (sometimes over an inch in diameter), called grains. Sometimes the grains have a number perforations instead of one. In some processes the powder is prepared with the use of various solvents, chiefly acetone, alcohol and ether, but it may also be prepared in known manner without the use of these solvents.

In the drawings:

Figure 2 is a detailed enlarged view in longitudinal section of a die constructed in accordance with my invention.

Figure 3 is a diagrammatic cross-section of a die without a spindle, but having the same free transverse cross-section area as the die shown in Figure 2, and a diameter at any point along the axis equal to the "apparent" diameter of the die shown in Figure 2 at the corresponding point on its axis.

Figure 1:
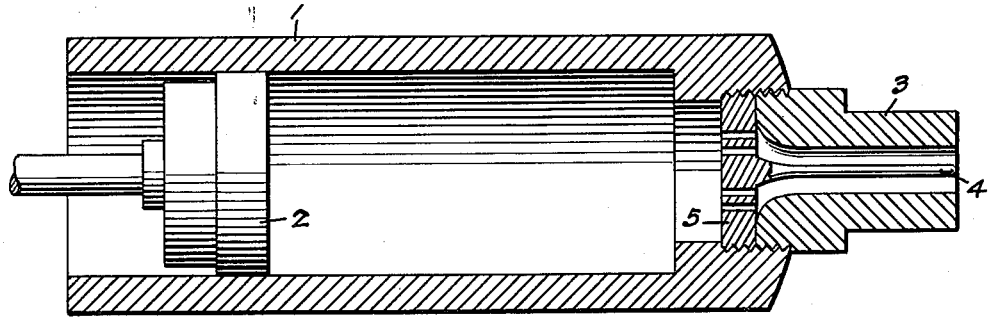
Figure 1 is a sectional view of an extrusion press, for extruding powder through a die made in accordance with my invention.

Figure 1 shows diagrammatically an extrusion press comprising a cylinder 1, a plunger 2 and an extrusion die 3 having a spindle 4 supported on a web 5 which is perforated to permit the passage of powder. A charge of powder, in plastic form, is placed in the cylinder, and the plunger is inserted in the cylinder, and forced against the plastic mass by suitable pressure means (not shown) to extrude the powder. In the example shown, the powder will emerge in the form of a hollow tube, which, when chopped into suitable lengths, provides a commonly used form of so-called powder grain. It is obvious that the spindle may be omitted to produce a multi-perforated grain, and I intend my invention to embrace all of these well-known forms, being limited only by the appended claims.

Figure 5:
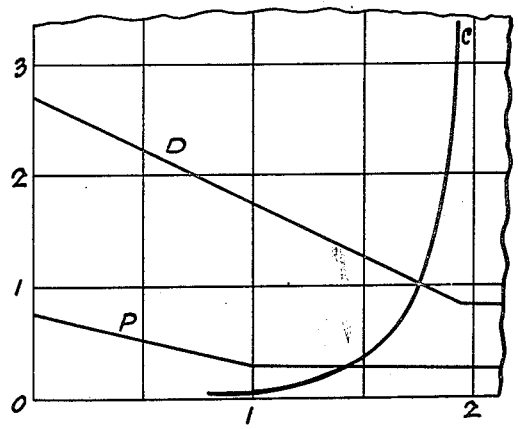

Prior to the use of solventless powders, dies used in extruding double base powders have been formed with a conical or haphazardly curved contour in the contracting section, as shown at D in Figure 5. When this type of die was used with solventless double base powders, there was found to be an upper limit to the extrusion rate beyond which structural failure in some parts of the product resulted. This may be very serious, as the burning rate of these powders depends upon the uniformity of the product both as to physical dimensions and lack of faults or fissures in the texture of each grain of powder. Combustion at a rate different from that calculated may seriously interfere with the ballistics of the projectile, or even cause premature explosion. It is therefore very important that the individual tubes or grains of powder be of a predetermined size and texture within close limits, otherwise individual inspection of the grains may be required, greatly increasing cost and reducing speed of production.

Analysis of the rate of deformation of the powder has shown that dies having a conical contour give a very high rate of deformation at the end of the contour. Accordingly I have, in accordance with my invention, changed the contour so that a greater rate of cross-sectional area contraction is achieved toward the entrance end of the contour permitting the contraction rate at the exit to be lower.

I shall now proceed to explain the theory underlying the improved design of my die contour, which has been shown to eliminate the difficulties encountered with the types of dies previously used for this type of material.

Powder must undergo shear in going through the contracting section of the die. Furthermore it is necessary to accelerate the rate of shear from its lowest value in the cylinder to the highest value at the exit. A die contour is calculated below which is designed to provide the necessary acceleration in the shear rate (determined by the entrance and exit cross sectional areas) in the shortest possible axial distance without causing excessively high acceleration at any one point in the die. Short die contours are desirable both from the standpoint of ease of fabrication and from the standpoint of elimination of spindle drifting and web variation. In order to provide the necessary overall acceleration while keeping its magnitude to a minimum at any place, a contour providing constant shear acceleration is needed.

A rather general calculation of the die contour will be given below in which the flow is assumed to be of a type intermediate between viscous flow and plug movement. Plug movement involves slippage at the wall of constant or varying amount. From the general formula so obtained it can be seen that if the flow is viscous or if there is constant wall slippage through the die contour the same contour provides constant shear acceleration. Experiments with three different powder compositions indicate that flow with solventless double base powders is of the viscous type.

In the analysis given below, the following symbols will be used, with particular reference to Figures 2 and 3:

$v$=linear flow rate of annulus element at a distance $r$ from the center of the tube.
$v_0$, $v_R$=linear flow rates at the center and outside edge of a tube radius R.
$Q$=volume flow from a tube.
$dq$=volume flow rate from an annulus element at a distance $r$ from the center of the tube.
$L$=length of contracting section of the die.
$x$=axial distance from entrance end of die contour.

$A=$ (cross sectional area at a point $x$) $=\frac{\pi}{4}(D^2-p^2)$.

$A_L$=cross sectional area at the exit of the die contour.
$H$=apparent diameter-diameter of equivalent free cross-sectional area.

$$H^2=\frac{4}{\pi}A=D^2-p^2$$

$p$=pin diameter, i. e. diameter of spindle, where a single spindle is used.
$D$=die diameter
$S$=rate of shear at a point a distance $r$ from the center of the tube
$S=dv/dr$ Figure 2 shows the flow of powders in a die having a spindle. The symbols for $x$ D and P in the list given above shown in Figure 2 and are self-explanatory.

Figure 3 shows a die without a spindle, but having an equivalent free cross-sectional area to that of die shown in Figure 2, that is $$H^2=\frac{4A}{\pi}$$

where $$A=\frac{\pi}{4}(D^2-p^2)$$

or in other words A equals the unobstructed area of the die in Figure 3. This equivalent value can be handled more conveniently than that of Figure 3 for the purpose of analysis. Otherwise, the symbols have the same significance in Figures 2 and 3.

In the general case we define $f(x)=v_R/v_0$ where $f(x)$ describes the type of flow.

Consider the flow of an annulus element in a tube. Suppose that the pressure drop is $\delta p$ over a length, $l$ (i. e. a unit length). The force impelling the annulus to move is $dF=\delta p.2\pi rdr$. For the condition of steady flow the viscous drag in equilibrium with this is $dF=d(2\pi rl.\eta dv/dr)$ where $\eta$ is the coefficient of viscosity. Thus $$p2\pi rdr=d(2\pi rl\eta dv/dr)$$

Integrating twice and evaluating the constants according to the conditions at the entrance and exit end of the contour we get (1) $$v=\frac{v_0[R^2-(l-f)r^2]}{R^2}$$

This gives the linear velocity of any flowing annulus in a tube of radius R compared to $v_0$ the velocity of the center annulus. This can be differentiated to give the rate of shear (2) $$S=dv/dr=\frac{-2v_0(l-f)r}{R^2}$$

This quantity $v_0$ can be calculated from the volume rate of flow $$\int_0^R dq=\int_0^R 2\pi rdrv=\int_0^R 2\pi rdrv_0-\int_0^R \frac{2\pi rdrv_0(l-f)r^2}{R^2}$$

(3) $$Q=\frac{\pi v_0 R^2(l+f)}{2}$$

Therefore $$s=\frac{-4Q}{\pi R^4}\left[\frac{l-f}{l+f}\right]r$$

Replace the fraction $$\left[\frac{l-f}{l+f}\right]$$

by $\varphi$ where the function $\varphi$ is now unity for viscous flow and zero for plug movement.

Consider the shear rate at a point $r=\alpha R$ (4) $$S=\frac{-4\alpha Q\varphi}{\pi R^3}=\frac{-32Q\alpha\varphi}{\pi H^3}$$

This expression gives the rate of shear in a tube. Uniform acceleration in shear is achieved by varying H in such a way that $dS/dt$ is constant, $$\frac{dS}{dt}=\frac{Q}{A}\frac{dS}{dx}=\frac{4\varphi}{\pi H^2}\frac{dS}{dx}$$

$$\frac{dS}{dt}=\frac{-32\alpha Q}{\pi H^3}\left[\frac{d\varphi}{dx}-\frac{3\varphi}{H}\frac{dH}{dx}\right]$$

Therefore $$\frac{dS}{dt}=\frac{-128Q^2}{\pi^2 H^5}\left[\frac{d\varphi}{dx}-\frac{3\varphi}{H}\frac{DH}{dx}\right]$$

Now $$\frac{d\left(\frac{\varphi^{5/3}}{H^5}\right)}{dx}=\frac{5}{3}\frac{\varphi^{2/3}}{H^5}\left[\frac{d\varphi}{dx}-\frac{3\varphi}{H}\frac{dH}{dx}\right]$$

Therefore $$\frac{d\left[\frac{\varphi^{5/3}}{H^5}\right]}{dx}=\frac{-5\varphi^{2/3}\pi^2\frac{dS}{dt}}{384\alpha Q^2}$$

Integrating $$\frac{\varphi^{5/3}}{H^5}=\frac{-5\pi^2\varphi^{2/3}\left(\frac{dS}{dt}\right)x}{384Q^2\alpha}+\text{constant}$$

At the limits where $x=0$, $\varphi=\varphi_0$ and $H=H_0$ and when $x=L$, $\varphi=\varphi_L$ and $H=H_L$ Evaluating the constant we get the expression $$(5) \quad \frac{\varphi^{5/3}}{H^5} = \frac{\varphi^{5/3}_0}{H_0^5} + \left[\frac{\varphi_L^{5/3}}{H_L^5} - \frac{\varphi_0^{5/3}}{H_0^5}\right]\frac{x}{L}$$

This is the general equation giving the change of the apparent diameter of the die contour with $x$ the axial distance from the die entrance when the length of the die contour is $L$. The type of flow is described by $\varphi$.

The simplest assumption we can make about the type of flow is that it is viscous in which case $\varphi$ is unity. In this case the die contour equation becomes $$(6) \quad \frac{l}{H^5} = \frac{l}{H_0^5} + \left[\frac{l}{H_L^5} - \frac{l}{H_0^5}\right]\frac{x}{L}$$

This same equation results if it is assumed that there is wall slippage independent of $x$. There is no reason to make any more complicated assumptions at this time but the die contour equation becomes difficult to work if any are made.

This equation reduced to a simple approximate form due to the fact that $$\frac{l}{H_0^5} \ll \frac{l}{H_L^5}$$

Thus, except at very low values of $x$ $$\frac{l}{H^5} = \frac{l}{H_L^5}\frac{x}{L}$$

or $$H^2 = \frac{H_L^2 \cdot L^{2/5}}{x^{2/5}}$$

When a tubular grain is being extruded the expression $$D^2 = p^2 + \frac{(D_L^2 - p_L^2)L^{2/5}}{x^{2/5}}$$

gives the diameter the die after assuming a convenient spindle shape.

If the contour of the die is laid out in accordance with the above expression the die will function in the desired fashion, namely, to produce constant shear acceleration as the powder moves from the entrance to the exit of the die. Thus, extrusion can be obtained without distortion being produced at a particular point in the travel of the powder along the die.

We can derive a contraction coefficient proportional to the acceleration in the rate of shear at the constant flow rate from the expression for $$\frac{dS}{dx}$$

above. Assuming $\varphi$ is unity the expression $$\frac{128\,\alpha}{\pi^2 H^5}\left(\frac{3}{H}\frac{dH}{dx}\right)$$

is proportional to this acceleration. Thus we can define $$C = \frac{l}{H^6}\frac{dH}{dx}$$

as a coefficient which can be used to compare dies.

In order to check the validity of the assumption that the flow is viscous in nature, observations were made of the flow lines obtained when powders of widely different dies were used for the extrusion, both with contours of constant C. No spider or spindle was used in the die during these extrusions. Pertinent data on these dies is summarized below.

| Die Number | Extrusion Ratio | Contracting Diam. (in.) | | Section Length (in.) | Parallel Section Length | |
|---|---|---|---|---|---|---|
| | | Entrance | Exit | | (in.) | Diameters |
| 21 | 10.0 | 2.75 | .868 | 0.50 | 3.5 | 4.0 |
| 22 | 10.0 | 2.75 | .868 | 2.00 | 3.5 | 4.0 |

In order to prepare the plugs in which the flow lines were observed a few extrusions were first made to fill the die with powder. A special charge was then made up consisting of circular wafers slightly smaller than the cylinder. Every 10th wafer was colored by irradiation or by painting with an acetone solution of nigrosine. The pile of 80 to 140 wafers was then heated and pressed slightly between platens to consolidate it to a coherent charge. This charge was extruded in the usual manner. After extrusion the die was removed from the press and the powder plug pushed out of the die, sectioned and photographed.

From the flow lines it was observed, first of all, that there is very little wall slippage with any of the three powders extruded in either die. Furthermore the flow lines are parabolic in cross section as would be expected from viscous flow.

This appearance of the flow lines obtained in the extrusion of two powders of different plastic properties indicates qualitatively at least that within the die contour the flow is viscous and hence the assumption $\varphi = 1$ is valid. Thus, the contour formula found above is verified by these flow line observations as well as by the practical results of extrusion tests.

Figure 4:
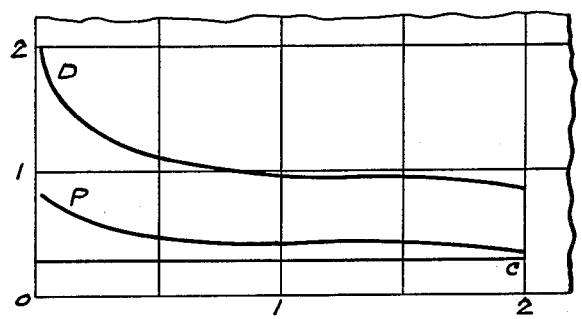
Figures 4–6 are graphs of typical die contours showing die diameter, spindle diameter and contraction coefficient.
Figure 6:
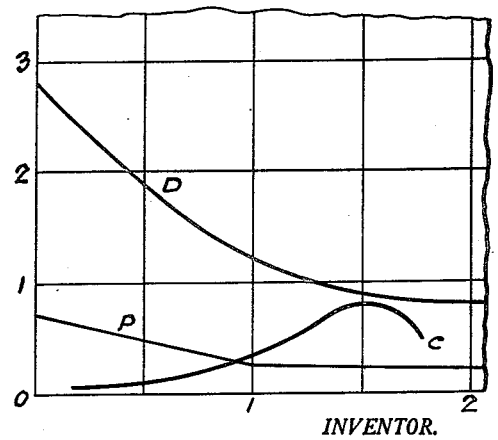

Graphs of typical die contours actually used are shown in Figures 4 to 6, in which the abscissa represents the axial distance $x$ through the die, while the ordinate is the diameter of the die (D) or the spindle pin (P) in inches or the contraction coefficient (C) in (inches). It will be seen that with the conical die previously used, the contraction coefficient rises to a very high value at the end of the contracting section, which accounts for the distortion produced in the extruded tubing. Dies formed in accordance with my invention do not have a greater tendency to produce distortion at any given point along their length than at any other point along the die. This is not true of any other shape. For example the circular arc contour shown in Figure 6 gives a maximum rate of shear acceleration with consequent tendency to distortion, at a point near the exit end of the die, as shown by the high value of C at that point.

The mathematical terms and symbols used in the following claims are intended to be defined, except for obviously conventional terms, by the preceding description and discussion, and are used in the claims in the same sense as in the description.

I claim:

1. An extrusion die assembly for double base powder comprising a die having an internal circular contour at right angles to its longitudinal axis and an internal exponential contour in a plane passing through the length of the longitudinal axis, said exponential contour being determined by the eqution $$H^2 = \frac{H_L^2 L^{2/5}}{x^{2/5}}$$

where H is the apparent diameter at a given point along the exponential contour of the equivalent free cross-sectional area of the circular contour, $H_L$ is the apparent diameter of the free cross-sectional area at the exit end of the exponential contour, L is the length of the contracting section of the die and X is the axial distance of said point from the die entrance.

2. An extrusion die assembly for double base powder comprising a die having an internal circular contour at right angles to its longitudinal axis, an internal exponential contour in a plane passing through the length of said axis and a spindle in the die concentrically disposed with respect to this axis, the exponential contour and the contour of the spindle being mutually determined by the equation $$D^2 = p^2 + \frac{(D_L^2 - p_L^2) L^{2/5}}{x^{2/5}}$$

where D is the diameter at a given point along the exponential contour of a cross-sectional area of the circular contour, $D_L$ is the diameter at the exit end of the exponential contour, $p$ is the diameter of the spindle at said point, $p_L$ is the diameter of the spindle at the exit end of the exponential contour, L is the length of the contracting section of the die and X is the axial distance of said point from the die entrance.

HOWARD E. HIGBIE.

No references cited.